No. 771,576. PATENTED OCT. 4, 1904.
J. E. SANDERS.
HAY PRESS.
APPLICATION FILED DEC. 19, 1902.
NO MODEL. 2 SHEETS—SHEET 1.
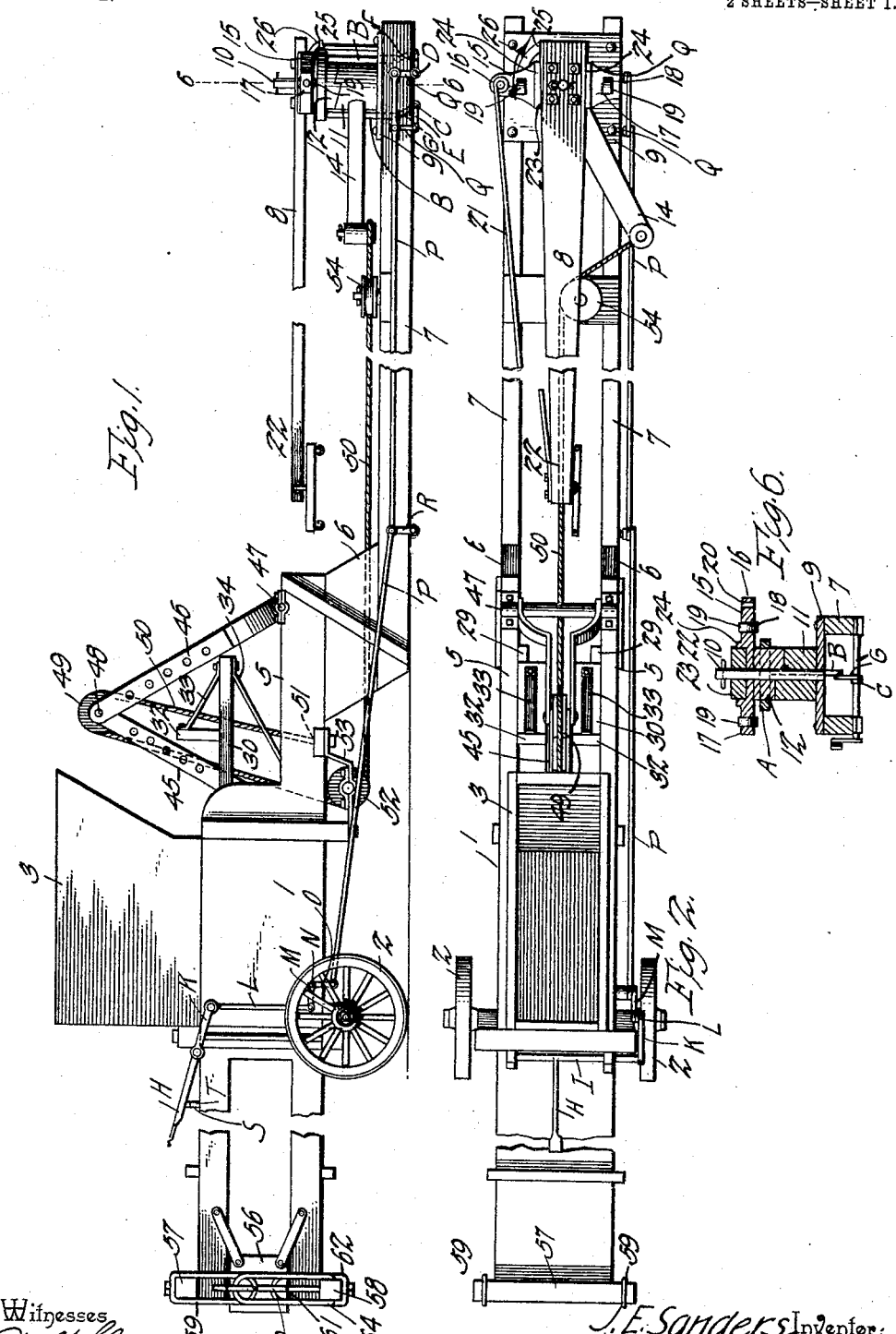
Witnesses
J. E. Sanders, Inventor
by C. A. Snow & Co.
Attorneys No. 771,576. PATENTED OCT. 4, 1904.
J. E. SANDERS.
HAY PRESS.
APPLICATION FILED DEC. 19, 1902.
NO MODEL. 2 SHEETS—SHEET 2.
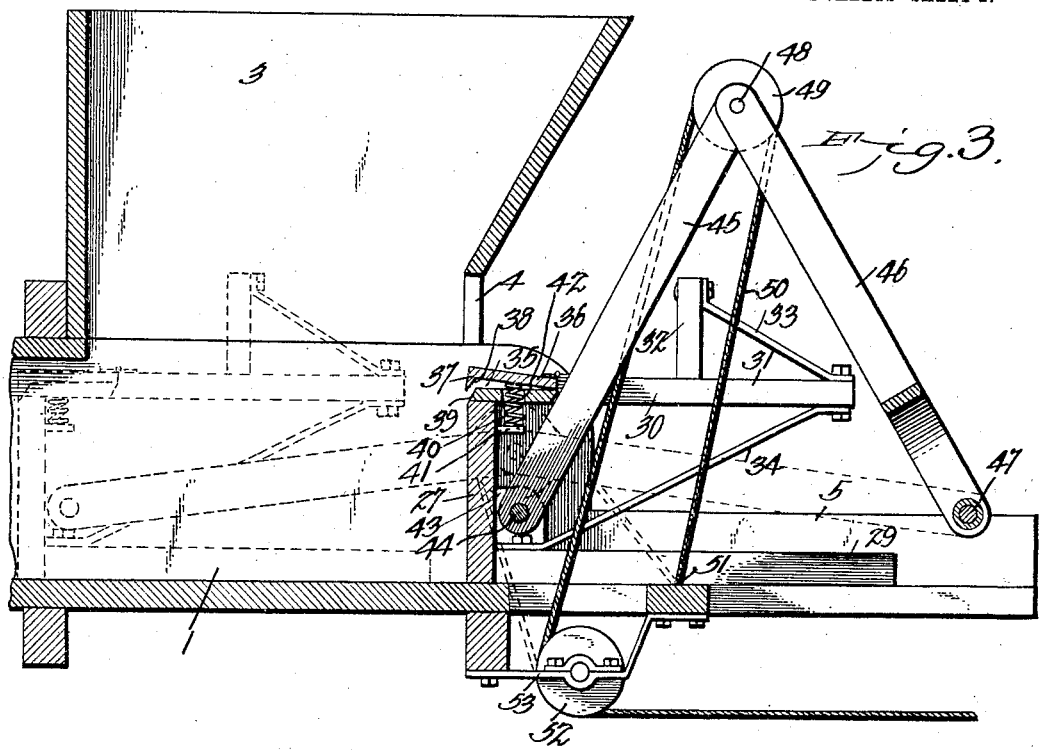
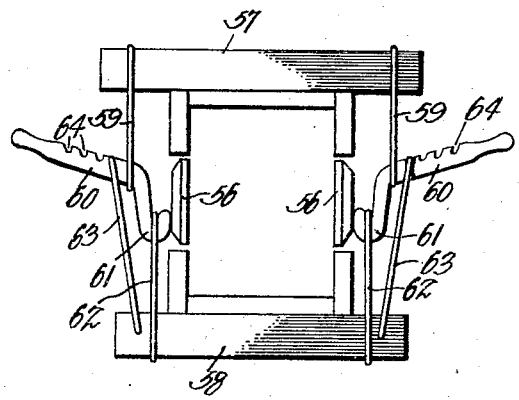
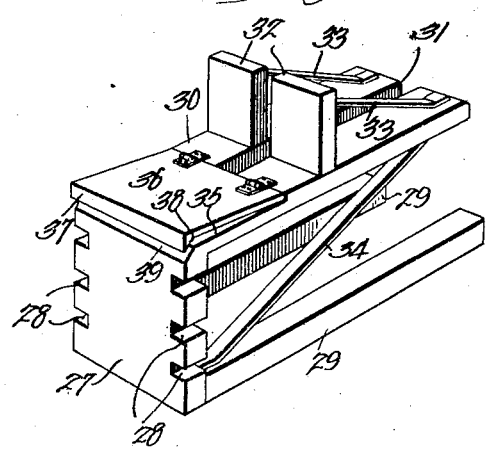

No. 771,576.

Patented October 4, 1904.

UNITED STATES PATENT OFFICE.

JAMES E. SANDERS, OF DALTON, GEORGIA.

HAY-PRESS.

SPECIFICATION forming part of Letters Patent No. 771,576, dated October 4, 1904.

Application filed December 19, 1902. Serial No. 135,933. (No model.)

*To all whom it may concern:*

Be it known that I, JAMES E. SANDERS, a citizen of the United States, residing at Dalton, in the county of Whitfield and State of Georgia, have invented a new and useful Hay-Press, of which the following is a specification.

This invention relates to hay-presses; and it has for its object to provide a device of this class which shall possess superior advantages in point of simplicity, durability, and general efficiency.

The invention has special reference to the improved means for operating the plunger, said means being composed of toggle-levers operated by the application of horse-power in such a manner that the full benefit shall be derived from the power exerted.

The invention further has reference to an improved construction of the plunger whereby the material fed into the hopper shall be subjected to a degree of preliminary pressure prior to its final compression in the press-box proper.

The invention further relates to an improved arrangement and disposition of the means for contracting the throat or discharge end of the press-box in order to create sufficient frictional resistance upon the bale that is being ejected to retard the progression of the bale that is being formed.

With these and other ends in view the invention consists in the improved construction, arrangement, and combination of parts, which will be hereinafter fully described, and particularly pointed out in the claims.

In the accompanying drawings, Figure 1 is a side elevation of a hay-press constructed in accordance with the principles of the invention. Fig. 2 is a top plan view of the same. Fig. 3 is a sectional elevation of a portion of the device, including a feed-hopper, the front end of the press-box, the toggle-levers, the plunger operated thereby, and adjacent parts. Fig. 4 is a perspective detail view of the plunger. Fig. 5 is a detail rear elevation of the press-box, showing the means for contracting the discharge end of the same. Fig. 6 is a sectional detail view taken on the line 6 6 in Fig. 1.

Corresponding parts in the several figures are indicated by similar characters of reference.

The press-box 1 of the device is in the main of ordinary construction and may be supported upon transporting-wheels 2. The front end of the press-box supports the feed-hopper 3, which is open at its lower front end, as shown at 4. The sides of the press-box are extended forwardly beyond the feed-hopper to form the brackets 5, having downward extensions 6, whereby they are connected with and supported upon the base-frame 7, which is extended a suitable distance in a forward direction to afford ample room for the sweep 8 of the horse-power.

The horse-power of the device is of extremely simple construction, comprising preliminarily a base-plate 9, which is supported upon and at the same time serves to connect the outer ends of the beams constituting the base-frame 7. The plate 9 is provided with a centrally-disposed upwardly-extending spindle 10, upon which two clutch members 11 and 12 are mounted revolubly in such a manner as to engage each other, as shown. The lower clutch member 11 is provided with a radially-extending arm 14, which may be formed integrally with or firmly secured thereto. The upper clutch member 12 is provided with a cross-head 15, the arms of which, 16 and 17, are provided with mortises 18, in which anti-friction-rollers 19 are journaled. The arm 18 is additionally provided with a perforation 20 for the reception of one end of a brace-rod 21, which connects the said arm with the outer end of the sweep 22, which latter is seated in a recess 23, formed between two vertical flanges 24 upon the upper side of the cross-head, to which latter the said sweep is firmly secured by means of bolts or other suitable fastening means.

25 designates a curved approximately segmental plate which is secured upon or connected with the base-plate 9 and which extends upwardly to a suitable height, its upper edge being beveled to form a cam 26, lying in the path of the friction-rollers 18, journaled in the arms of the cross-head. It will be seen that when power is applied to the sleeve the upper clutch member 12 will be rotated in the direction of the dart in Fig. 2, thus carrying with it the lower clutch member 11, with which it is normally in engagement. When either of the arms 16 or 17 reaches the cam 26, the roller 19, journaled in such arm, will pass into engagement with the cam 26, thus elevating the upper clutch member upon the spindle 10 and raising it out of engagement with the lower clutch member, which being thus released rebounds by the action upon the arm 14 of intermediate mechanism, which will be hereinafter described. As soon as the friction-roller 18 passes out of engagement with the cam 26 the weight of the upper clutch member and that of the cross-head and sweep supported thereon will restore said upper clutch member to its normal position in engagement with the lower clutch member, and the operation will be immediately repeated, with the sole exception that on the repetition it will be the friction-roller of the opposite arm of the cross-head that passes into engagement with the cam. Obviously by increasing the number of arms upon the cross-head the operation might be repeated three or more times to each revolution of the cross-head.

It may at times be desired to disengage the clutch members 11 and 12 from each other for the purpose of temporarily suspending the operation of the press. This may be accomplished by means of a tripping device comprising a ring A, mounted to slide vertically upon the said cylindrical clutch members 11 and 12 and mounted upon pins or rods B, that extend through the base-plate 9. Mounted in suitable bearings below the said base-plate are two rock-shafts C and D, having crank-arms E and F, that are connected, by means of links G, with the lower ends of the rods B, so that when the said rock-shafts are oscillated in their bearings they will operate to elevate the ring A until the latter by engaging the friction-rollers 19 will elevate the cross-head 15 and upper clutch member 12 until the latter is disengaged from the clutch member 11. It will be seen that when the ring A is thus elevated the rotation of the upper clutch member, with its related parts, may be continued indefinitely without imparting motion to the working parts of the press.

The rock-shafts C and D are operated by means of a foot-lever H, mounted upon the press-box in rear of the hopper 3, said foot-lever being attached to the center of a shaft I, extending transversely across the top of the press-box. The shaft I is provided at one end with a short arm or crank K, connected by a rod L with the horizontal arm M of a bell-crank lever fulcrumed at N, the vertical arm O of said bell-crank lever being connected, by means of a jointed rod P, with arms Q at the ends of the rock-shafts C and D. The jointed rod P is supported at the joint thereof by means of a pivoted brace R.

A short ratchet-bar S is mounted upon the press-box to engage the foot-lever when the latter is depressed for the purpose of locking it in position, and thus retaining the ring A indefinitely in a raised position.

A spring T is suitably disposed under the outer end of the foot-lever to elevate the latter when released from the pressure of the foot of the operator. The utility of this device will be readily understood, inasmuch as by the use thereof the working of the press may be suspended at any time without stopping the team—such as, for instance, in case of accident to one of the operators or breakage of any part of the press. In case the team should become unruly it will likewise be found of great advantage.

The plunger of the improved hay-press is constructed, preferably, of a massive cast-iron head 27, the sides of which are provided with recesses 28 to enable the said head to pass the retaining-springs in the interior of the press-box, which, however, being commonly found in hay-presses of ordinary construction have not been illustrated in the drawings. Extending forwardly from the lower corners of the head 27 are the guide-beams 29, and a top plate 30 likewise extends forwardly from the upper edges of the head 27. This top plate is provided with a centrally-disposed slot 31, extending through the greater part of its length, and at each side of said slot is disposed an upwardly-extending block 32, said blocks being connected by braces 33 with the front end of the top plate 30. Braces 34 likewise connect the front end of the top plate 30 with the rear ends of the guide-beams 29 at the points where the latter join the head 27.

The rearward portion of the top plate 30 is provided with a horizontal recess 35 for the reception of the hinged plate 36, having at its rear edge a downward-extending lip 37, the inner edge of which is beveled, as at 38, to engage the correspondingly-beveled upper edge 39 of the head 27. This hinged plate is normally supported upon springs 40, which rest upon brackets 41, extending rearwardly from the block 27, said springs being extended through openings 42 in the top plate 30. It will be seen that by this means the free end of the hinged plate 36 is normally held at a position slightly raised above the upper level of the plunger, while at the same time the depending lip 37 extends below and in rear of the upper part of the beveled portion 38 of the head 27. At no time should the free end of the plate 36 be raised to such an extent as to interfere with the passage of the plunger into the press-box proper. At the time when the entrance takes place the hinged plate 36 performs the function of a tucker to force the loose material from the feed-hopper into the press-box without danger of clogging or interference with the operation.

The head 27 of the plunger is provided on its front side near its lower edge with a transversely-perforated lug 43 to receive a bolt 44 or other suitable means for connecting it pivotally with one of the toggles 45. Another toggle, 46, is pivoted to the frame of the press at 47, and the two are connected pivotally with each other by means of a pin 48, which also carries a pulley 49.

50 is the draft-rope, which is securely connected to the frame at 51, passing thence over the pulley 49, under another pulley, 52, which is journaled in a suitable bracket 53 underneath the press-frame, and thence to the end of the arm 14 of the clutch member 11, to which it is made securely fast, a guide-pulley 54 being interposed, so as to guide the draft in the right direction. It is obvious that any other suitable connecting means may be substituted for a rope, and such connecting means may be flexible throughout or only the portions of the same that in practice engage the various pulleys.

At its discharge end the press-box is provided with flexible side boards 56, which may be compressed inwardly, so as to retard the progress of the bale which is being expelled, and thus cause sufficient frictional resistance to enable the next bale to be sufficiently compressed. The end frame-pieces 57 and 58 are extended beyond the sides of the press-box, as shown, and the upper end pieces carry a pair of links 59, supporting levers 60, the inner ends of which are provided with eccentrically-disposed hooks 61, which are connected by links 62 with the bottom frame-piece 58. The latter also is provided with a pair of pivoted links 63, engaging notches or ratchets 64 in the levers 60. It will be seen that by this construction the levers 60, being fulcrumed upon the supporting-links 59 when depressed, will bear with their eccentrically-hooked ends 61 against the flexible side boards 56, forcing the latter inwardly, the said levers being retained in such depressed position by means of the links 63 engaging the notches 64 in the levers. By this mechanism the pressure upon the flexible side boards 56 may be easily and quickly regulated and adjusted in the manner and for the purpose indicated.

The operation and advantages of this invention will be readily understood from the foregoing description taken in connection with the drawings hereto annexed. The construction is simple and inexpensive, and provision has been made whereby the machine may be operated very rapidly and with good results. In the accompanying drawings means have been shown whereby the plunger is made to operate twice to each revolution of the horse-power; but, as stated, the cross-head of the said horse-power may be readily altered, so that any desired number of operations of the plunger may be accomplished to each revolution of the horse-power.

Other changes and modifications may be made such as will readily suggest themselves to those skilled in the art to which the invention appertains, and I desire it to be understood that I reserve the right to any changes and modifications which may be resorted to without detracting from the utility of my invention or departing from the spirit and scope thereof.

Having thus described my invention, I claim and desire to secure by Letters Patent of the United States—

1. In a device of the class described, a press-box, the feed-hopper provided with an opening in the front thereof, a plunger having an elongated top plate provided with a longitudinal slot, toggle members having pivotal connection with each other and respectively with the press-frame and the plunger, the latter member being accommodated in the longitudinal slot of said plunger, and braced blocks disposed upon the top plate on either side of the slot therein and adapted to enter the feed-hopper through the opening in the front thereof and exert preliminary pressure upon the contents of said feed-hopper.

2. The herein-described plunger comprising a head-plate, guide-beams extending rearwardly from the lower corners thereof, a top plate extending rearwardly from the upper edge of said head-plate, a tucker-plate having hinge connection with the said top plate, brackets extending rearwardly from the head-plate, and springs supported upon said brackets, extending through openings in the top plate and supporting the tucker-plate.

3. In a hay-press, the press-box having flexible side boards, the upper and lower frame members arranged at the discharge end of the press-box and extended beyond the sides thereof, links supported upon the ends of the upper frame member, levers supported by said links and having eccentric hooked members and notched handle members, links connecting said hooked members with the lower frame member, and links pivotally connected with the latter and engaging the notched handle members of the levers.

In testimony that I claim the foregoing as my own I have hereto affixed my signature in the presence of two witnesses.

JAMES E. SANDERS.

Witnesses:
　LUCY ROBERTS,
　D. K. McKAMY.